(12) United States Patent
New et al.

(10) Patent No.: US 6,625,467 B2
(45) Date of Patent: Sep. 23, 2003

(54) METHOD AND APPARATUS FOR PERFORMING IDLE MODE REACQUISITION AND HANDOFF IN AN ASYNCHRONOUS COMMUNICATION SYSTEM

(75) Inventors: Wen Jing New, San Diego, CA (US); Mark Levin, San Diego, CA (US); Robbin D. Hughes, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 432 days.

(21) Appl. No.: 09/751,607

(22) Filed: Dec. 29, 2000

(65) Prior Publication Data

US 2002/0006805 A1 Jan. 17, 2002

Related U.S. Application Data (60) Provisional application No. 60/218,552, filed on Jul. 13, 2000.

(51) Int. Cl.[7] .............................. H04B 7/00; H04Q 7/20
(52) U.S. Cl. ...................... 455/525; 455/436; 455/437; 455/442; 455/502; 370/332
(58) Field of Search ................................ 455/436, 437, 455/438, 439, 440, 441, 442, 500, 502, 513, 515, 517, 524, 525, 574; 370/332

(56) References Cited

U.S. PATENT DOCUMENTS

| | | | | |
|---|---|---|---|---|
| 5,722,072 A | * | 2/1998 | Crichton et al. ............ 455/437 |
| 5,754,958 A | * | 5/1998 | Tsuji et al. .................. 455/436 |
| 6,151,502 A | * | 11/2000 | Padovani et al. ........... 455/442 |
| 6,236,860 B1 | * | 5/2001 | Hagting et al. ............. 455/436 |
| 6,456,606 B1 | * | 9/2002 | Terasawa ..................... 370/331 |

FOREIGN PATENT DOCUMENTS

| | | | | |
|---|---|---|---|---|
| WO | 9715160 | 4/1997 | ............ H04Q/7/20 |
| WO | 9833288 | 7/1998 | ............ H04Q/7/20 |
| WO | 9923847 | 5/1999 | ............ H04Q/7/32 |
| WO | 9941854 | 8/1999 | ............ H04B/7/26 |

* cited by examiner

*Primary Examiner*—Nguyen T. Vo
*Assistant Examiner*—Simon Nguyen
(74) *Attorney, Agent, or Firm*—Philip R. Wadsworth; Charles D. Brown; George C. Pappas (57) ABSTRACT

Techniques to efficiently process paging channels in an asynchronous wireless communication system. In one aspect, if the base stations are not synchronized with each other and a remote terminal's designated page time is different from base station to base station, the remote terminal can wake up based on the earliest base station in a reacquisition search list that includes candidate base stations to which the remote terminal may be handed off. In another aspect, the criteria to select base stations for evaluation as reacquisition targets may be based on the received power of the base stations as well as their timing, both of which may be made relative to that of a preferred base station. In yet another aspect, the remote terminal may wake up multiple times in a particular paging cycle (i.e., a frame cycle or a DRX cycle) if there are one or more candidates base station to which the remote terminal may be handed off.

25 Claims, 9 Drawing Sheets

METHOD AND APPARATUS FOR PERFORMING IDLE MODE REACQUISITION AND HANDOFF IN AN ASYNCHRONOUS COMMUNICATION SYSTEM

CROSS REFERENCE TO RELATED APPLICATIONS

This application claims the benefit of provisional U.S. application Ser. No. 60/218,552, entitled "SLOTTED MODE SEARCH, REACQUISITION, HANDOFF TO ASYNCHRONOUS WCDMA (DS) SLOTTED MODE," filed Jul. 13, 2000, which is incorporated herein by reference in its entirety for all purposes.

BACKGROUND OF THE INVENTION

I. Field of the Invention

The present invention relates to communication. More particularly, the present invention relates to a novel and improved method and apparatus for performing idle mode reacquisition and handoff in an asynchronous wireless communication system.

II. Description of the Related Art

In a typical wireless communication system, the remote terminals are only sporadically active. For example, a cellular telephone remains idle for significant periods of time when no call is in progress. However, to ensure that any message directed to a remote unit is received, the remote unit periodically monitors the communication channel, even while it is idle. Messages transmitted by the base stations may include those for alerting the remote terminal to the presence of an incoming call and those for updating system parameters in the remote terminal.

During idle mode, the remote terminal continues to consume power to sustain the circuitry necessary to monitor the signals from the base stations. Many remote terminals (e.g., cellular telephones) are portable and powered by an internal battery. The power consumption by the remote terminal in the idle mode decreases the available battery resources, which shortens the "standby" time between battery recharges and the "talk" time when a call is placed or received. Therefore, it is highly desirable to minimize power consumption in the remote terminal in the idle state and thereby increase battery life.

In one technique for reducing power consumption in a remote terminal operating in the idle mode, the remote terminal periodically enters an "active" state during which it can receive messages on a paging channel from the base stations with which it has previously established communication (i.e., the base stations in the active set). The paging channel may be divided into numbered "frames" (e.g., frames 0 through 1023) and the remote terminal may be assigned one or more frames by the base stations. (A frame may also be referred to as a "slot" or a "time-frame" in some other CDMA systems.) Thereafter, the remote terminal wakes up from an "inactive" state prior to its assigned frame, monitors the paging channels for messages, and reverts to the inactive state if additional communication is not required. In the time period between successive active states, the remote terminal is in the inactive state and the base stations do not send any messages to the remote terminal. In the inactive state, as much circuitry as possible is powered down to conserve power.

Before entering the inactive state (or power saving mode), a remote terminal communicates its presence to a "preferred" base station, which is also often referred to as a "serving cell". Typically, the preferred base station is the base station that has the strongest pilot signal as measured by the remote unit. During its active state, the remote unit measures the pilot signal strength of the preferred base station as well as the pilot strengths of neighboring base stations. If the remote unit relocates from the coverage area of the preferred base station to a neighboring base station's coverage area, the remote unit needs to "handoff" communication to the neighboring base station. When a handoff occurs, the neighboring base station is assigned as the new preferred base station.

The preferred base station's pilot signal is typically stronger than any of the measured neighbor pilot signals when the remote unit enters its inactive state. Therefore, when the remote unit enters the next active state, it monitors the preferred base station. However, while the remote unit is in its inactive state, it may have relocated from the coverage of the preferred base station into the coverage of a neighboring base station. When the remote unit is in its inactive state, it does not monitor the signal strengths of the preferred and neighboring base stations. Moreover, even if the neighboring base station's signal has increased to a signal strength sufficiently greater than that of the preferred base station for a handoff to occur, the remote unit does not perform a handoff while in the inactive state.

Thus, when the remote unit returns to the active state, it may not be monitoring the "optimum" base station. In fact, the signal strength from the preferred base station may be so low that the remote unit is unable to properly decode the information transmitted from this base station, and may miss important pages intended for the remote terminal. For a remote terminal to monitor the optimum base station, the remote terminal measures the preferred base station and some candidate neighbor base stations, and handoff to a strong neighboring base station if necessary before the remote terminal's assigned page time.

For a synchronous communication system, such as an IS-95 CDMA system, the timing of all base stations in the system is aligned. A remote terminal can thus be assigned the same time-aligned frame by the base stations. From the remote terminal's perspective, its assigned page time is the same for the preferred base station as for neighboring base stations in a synchronous communication system. By knowing the timing of the preferred base station, the remote terminal is able to determine its assigned page time on the preferred as well as neighboring base stations. By synchronizing its timing to the preferred base station's timing, the remote terminal automatically synchronizes its timing to that of the neighboring base stations. Therefore, if the remote terminal can handoff to a neighboring base station before its assigned page time on the old preferred base station, the remote terminal can decode its assigned page information on the neighbor base station on time.

Some newer generation wireless communication systems are not synchronous, and the timing (and thus, frames) of the base stations is not aligned. As a result of the asynchronous timing among base stations, the assigned page time, from a remote terminal's perspective, may be different from base station to base station. By knowing the timing and the assigned paging time of the preferred base station, the remote terminal typically cannot determine the assigned paging time on a neighboring base station. If the remote terminal moves to the neighboring base station's coverage area, the remote unit needs to synchronize its timing to this neighboring base station's timing in order to decode information transmitted from this base station. Therefore, if a remote terminal tries to wake up to decode paging information on the preferred base station but ends up handing off to a neighboring base station due to change in coverage area, the remote terminal may completely miss the assigned paging time of the neighboring base station, and may thus miss important paging information.

Therefore, there is a need in the art for a method and apparatus for performing idle mode reacquisition and handoff in asynchronous wireless communication systems.

SUMMARY OF THE INVENTION

The invention provides various techniques to efficiently process paging channels in an asynchronous wireless communication system. In accordance with one aspect of the invention, if the base stations are not synchronized with each other and a remote terminal's assigned paging time is different from base station to base station (from the remote terminal's perspective), the remote terminal wakes up based on the earliest base station (from the remote terminal's point of view) in a "reacquisition search" list. This list includes the preferred base station as well as neighboring base stations to which the remote terminal may be handed off at a subsequent wake-up interval. This allows the remote terminal to perform reacquisition searches and reacquisition handoff and avoid missing pages.

In accordance with another aspect of the invention, the criteria to select base stations for the reacquisition search list may be based on the base station timing as well as the measured signal strength of the base stations, both of which may be made relative to that of the preferred base station. In an embodiment, if, from the remote terminal's point of view, a neighboring base station's timing is in close proximity of the preferred base station's timing, and if the neighboring base station's signal is measured strong enough before entering the inactive state, then this neighboring base station is added to the reacquisition search list, together with the preferred base station. The next scheduled wake-up time (or active state) is then based on the earliest of the preferred and neighboring base stations in the list. In this manner, the preferred and neighboring base stations will be searched and evaluated, and the paging information from the base station with strongest signal is decoded, at the next active state.

Otherwise, if a neighboring base station's timing is outside the proximity of the preferred base station's timing, and if the neighboring base station's signal is measured sufficiently stronger than the preferred base station before entering the inactive state, then this neighboring base station is added to the reacquisition search list, together with the preferred base station. However, the next scheduled wake-up time (or active state) is based on the neighboring base station's paging channel timing. In this case, this neighboring base station and the preferred base station will be searched and evaluated at the next active state. If the neighboring base station is still sufficiently stronger than the preferred base station, then it will become the new preferred base station and the paging information from this base station will be decoded. However, if the neighboring base station is no longer sufficiently stronger than the preferred base station, the remote terminal will not decode any paging information. Instead, the remote terminal enters the inactive state immediately and prepares for reacquiring and decoding the preferred base station at the next active state.

By dividing the neighboring base stations into different categories according to their timing relation to the preferred base station, the amount of time the remote terminal needs to be in the active state may be reduced, which may translate to improvement in the remote terminal's stand-by time, without missing important paging information.

In accordance with yet another aspect of the invention, the remote terminal may wake up multiple times in a particular paging cycle (i.e., a DRX cycle) if the preferred base station and strong neighboring base stations (handoff candidates) are outside the timing proximity of each other. A neighboring base station may be identified as a handoff candidate if it meets a set of criteria, which may be based on the base station energy measurement and a reselection timer value, as described in further detail below.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
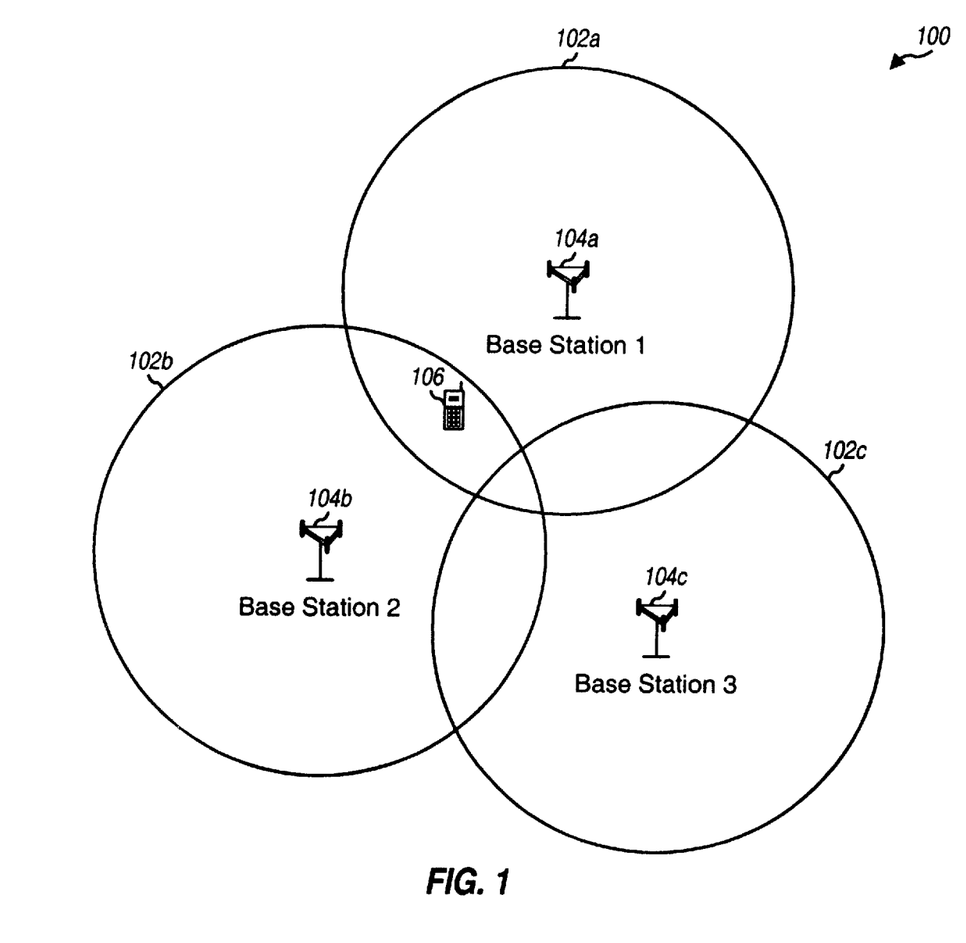
FIG. 1 is a diagram of a wireless communication system that includes a number of base stations and supports a number of users.

FIG. 1 is a diagram of a wireless communication system 100 that includes a number of base stations and supports a number of users. System 100 includes a number of base stations 104 (only three base stations are shown in FIG. 1 for simplicity), with each base station serving a particular coverage area 102. The base station and its coverage area are often collectively referred to as a cell.

A number of remote terminals 106 are typically dispersed throughout the system (only one terminal is shown in FIG. 1 for simplicity). Each remote terminal 106 may communicate with one or more base stations on the forward and reverse links at any moment in the active mode, depending on whether the remote terminal is in soft handoff. In the idle mode, a remote terminal typically only communicates with one base station at a time.

In the example shown in FIG. 1, base station 1 is the preferred base station (which is also often referred to as the serving cell) for remote terminal 106, and base stations 2 and 3 are the neighboring base stations of base station 1. The preferred base station is generally the base station whose signal is received the strongest by the remote terminal. The remote terminal is typically expected to receive its paging information from the base station with the strongest signal, and therefore from the preferred base station.

Figure 2A:
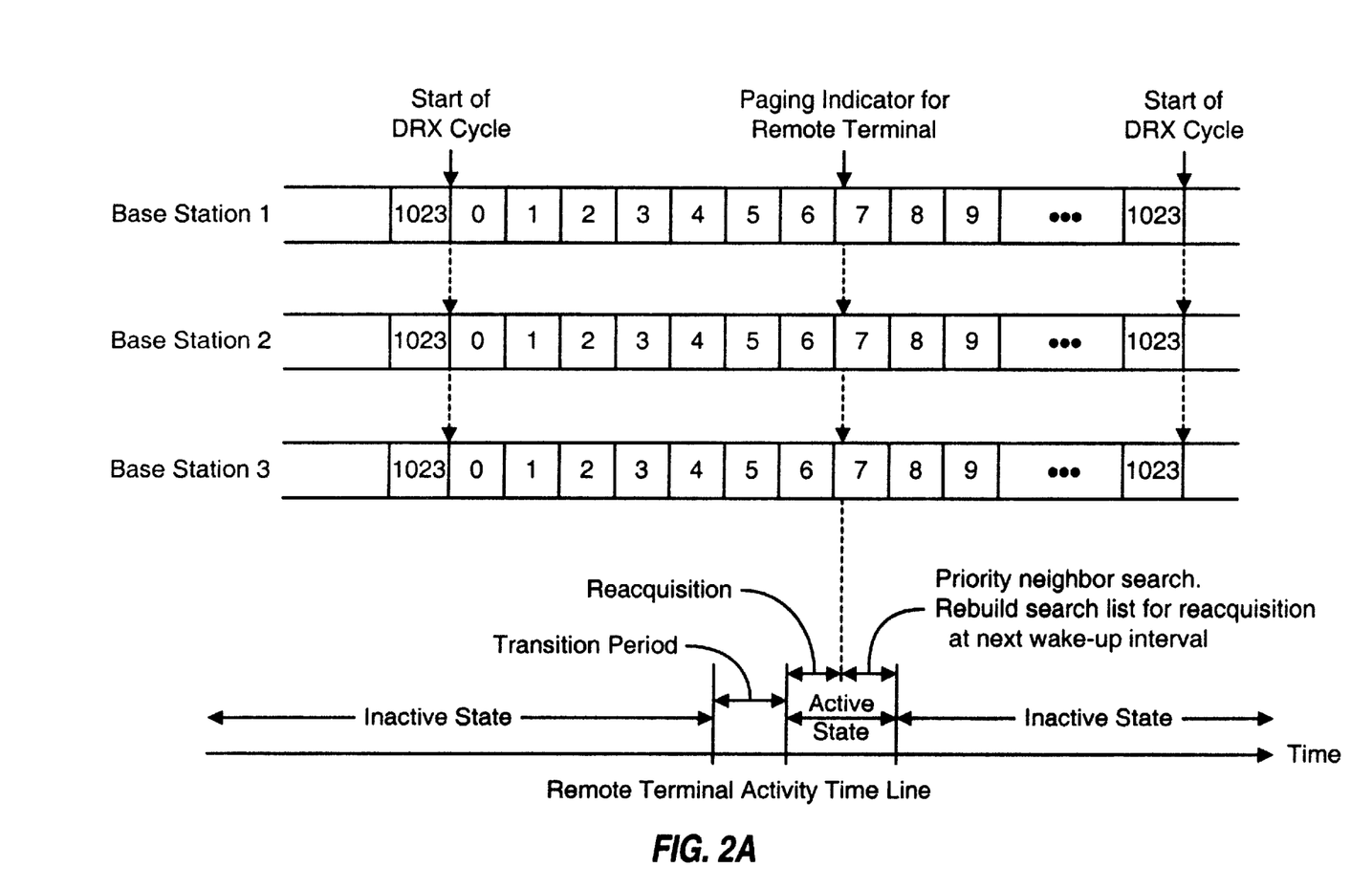
FIG. 2A is a diagram of a specific implementation and timing relationship of the paging channels (with 1024 frames in each DRX cycle) of three base stations in a synchronous communication system.

FIG. 2A is a diagram of a specific implementation and timing relationship of the paging channels of three base stations in a synchronous communication system. A paging channel is typically employed by a wireless communication system to send paging or control messages to the remote terminals. The paging channel structure shown in FIG. 2A generally conforms to a standard offered by a consortium named "3$^{rd}$ Generation Partnership Project" (3GPP) and embodied in a set of documents including Document Nos. 3G TS 25.211, 25.212, 25.213, 25.214, 25.133, 25.305, 25.331 and 3G TR 25.926 (hereinafter, the W-CDMA standard), which is incorporated herein by reference. (However, the W-CDMA standard does not specify synchronization of the paging channels.) In the implementation shown in FIG. 2A, the paging channel is partitioned into DRX (discontinuous receiving mode) cycles, with each DRX cycle including a number of frames (e.g., 1024 frames). Each frame covers a particular time interval (e.g., 10 msec), and the frames in each DRX cycle are sequentially numbered (e.g., from frame 0 through frame 1023). In the specific example shown in FIG. 2A, the base stations are synchronized and the DRX cycles for all three base stations are time-aligned with each other. The DRX cycles are also approximately aligned at the remote terminal, with any time offset being primarily due to differences in the transmit time from the base stations to the remote terminal. The DRX cycles and frames in FIG. 2A correspond to slot cycles and slots, respectively, in some other slotted mode paging implementations (e.g., for an IS-95 CDMA system).

Figure 2B:
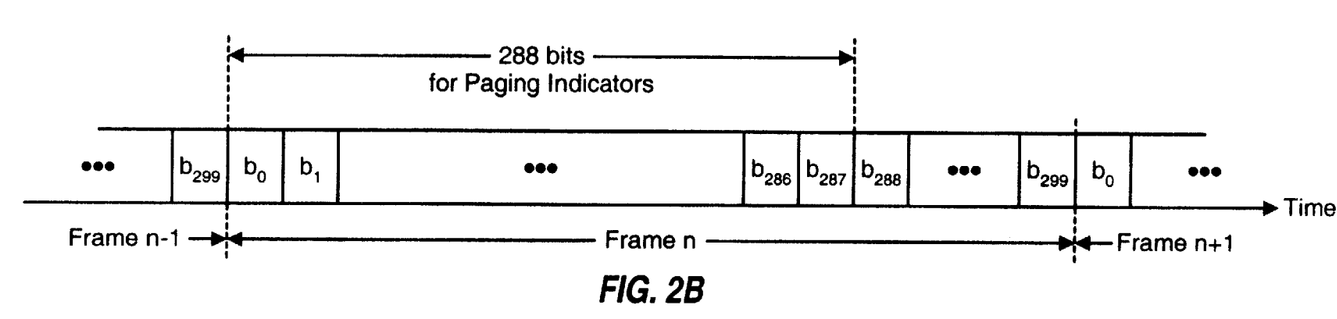
FIG. 2B is a diagram of a specific implementation and timing relationship of a paging indicator frame for the paging channel structure shown in FIG. 2A.

FIG. 2B is a diagram of a specific implementation and timing relationship of a paging indicator frame for the paging channel structure shown in FIG. 2A, as defined by the W-CDMA standard. In this implementation, the frame includes 300 bits, of which 288 can be used for transmitting up to 144 page indicators. A remote terminal is assigned to a particular page indicator within a DRX cycle based on a number of parameters such as, for example, the remote terminal's identification number. Each page indicator covers two to 16 bits in a frame, depending on the number of page indicators included in the frame.

Referring back to FIG. 2A, to conserve power, a remote terminal can be assigned a particular paging indicator within a particular frame in each DRX cycle. The paging indicator (e.g., if set to one "1") directs the remote terminal to process the corresponding frame of an associated channel to receive paging information. In the example shown in FIG. 2A, the remote terminal is assigned to a paging indicator in frame 7. While the remote terminal is idle, it may remain in the inactive state for much of the time except for a "wake-up" time period around its assigned paging indicator. In the inactive state, some of the circuitry (e.g., power amplifiers, and so on) within the remote terminal may be powered down to conserve power.

Prior to its assigned paging indicator, the remote terminal transitions from the inactive state to the active state to process the assigned page indicator. A certain amount of time is needed to power up circuitry that has been powered down previously and to allow the circuitry to warm-up and settle. After this transition period, the remote terminal enters the active state and measures the signal strength of the base stations included in a reacquisition search list. This list includes the current preferred base station and neighboring base stations to which the remote terminal may be handed off if certain conditions are met. At the designated time in the assigned frame (indicated by the vertical dashed line in FIG. 2A), the remote terminal demodulates the page indicators in the paging channels of the preferred base station for indications of whether page information has been transmitted for the remote terminal.

During the inactive state, the remote terminal may move to a different service area or the communication link (or signal paths) may change. Thus, as part of the processing in the active state, the remote terminal performs searches on neighboring base stations, in addition to those in the reacquisition search list, before entering the next inactive state. Based on the search results, the remote terminal builds a new reacquisition search list that contains the preferred base stations and those neighboring base stations that are potential handoff targets at the next wakeup interval. The wake-up interval includes the transition period and the time the remote terminal is in the active state (i.e., the time between successive inactive states).

As shown in FIG. 2A, for a synchronous system, the timing of the base stations is aligned and the start of the DRX cycles for the paging channels is also time-aligned. Thus, as long as all base stations have the same DRX cycle length, the assigned paging indicators for a remote terminal from all base stations are also time-aligned. The remote terminal can wake up once in each DRX cycle and demodulate its page indicator from any of those base stations at that time.

Figure 3:
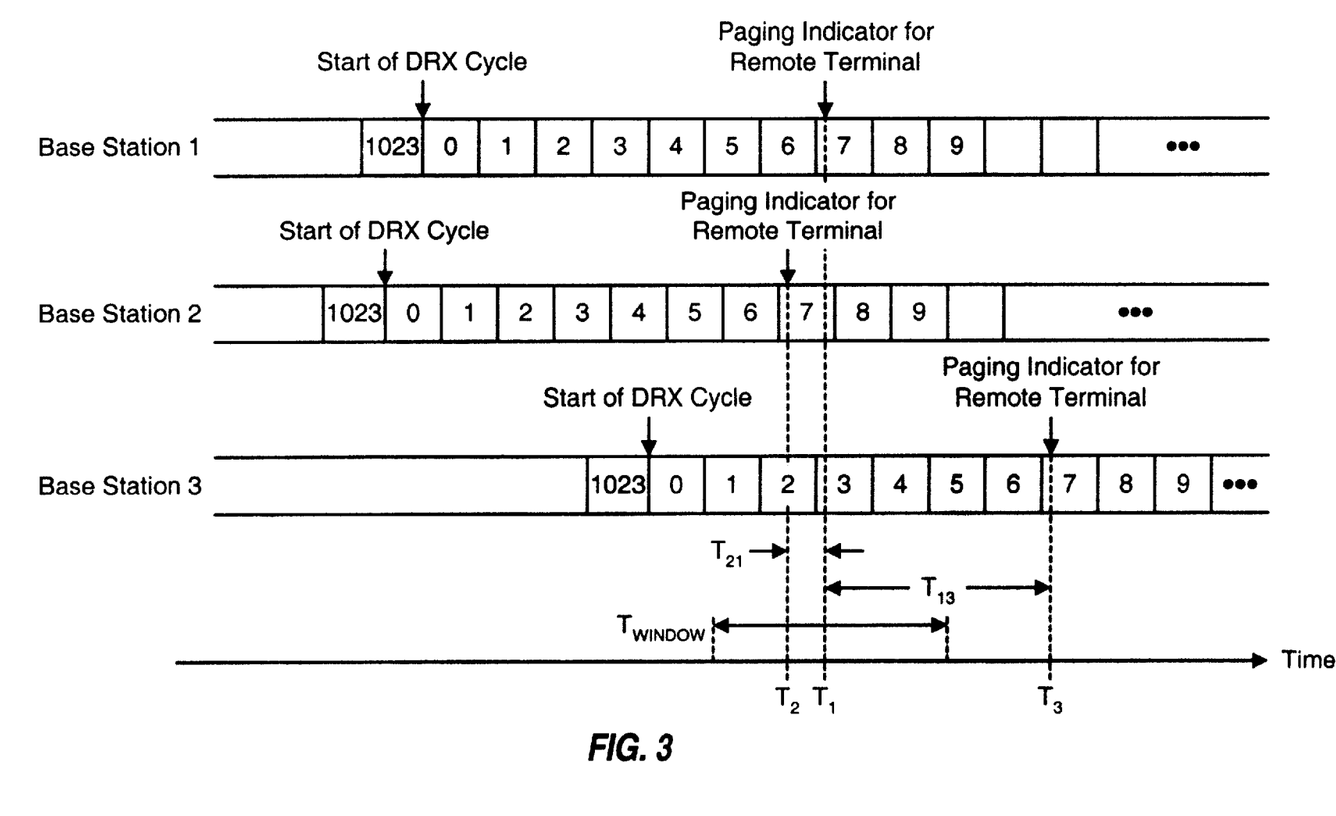
FIG. 3 is a diagram of a specific implementation of the paging channels of three base stations in an asynchronous system.

FIG. 3 is a diagram of a specific implementation of the paging channels of three asynchronous base stations in an asynchronous system. In this implementation, the paging channel is also partitioned into DRX cycles, with each DRX cycle including a number of (e.g., 1024) frames. However, in this implementation, the timing of the base stations is not synchronized and, as a result, the start of DRX cycle for each base station can occur at any point in time. One such asynchronous system is defined by the W-CDMA standard. In a W-CDMA system, each base station transmits based on a system frame number (SFN), and the SFNs of neighboring base stations may not be synchronized with that of the preferred base station.

In the example shown in FIG. 3, base station 1 is the preferred base station (i.e., the serving cell) and base stations 2 and 3 are neighboring base stations. When the remote terminal uses the preferred base station's timing as its timing reference, the start of DRX cycle ($T_2$) for neighboring base station 2 is a short time period ($T_{21}$) ahead of the start of DRX cycle ($T_1$) for the preferred base station 1, and the start of DRX cycle ($T_3$) for neighboring base station 3 is a longer time period ($T_{13}$) after that of the preferred base station 1.

Because of the asynchronous system timing, the paging indicator assigned to the remote terminal by the preferred and neighboring base stations are unlikely to be time-aligned, and can in fact occur at any point in time. A remote terminal can be designed to wake up before its assigned paging indicator of each of N base stations in the reacquisition search list. In the worse case, if the assigned frames do not overlap, the remote terminal would need to wake up N times for each DRX cycle, which is up to N times more than in a synchronous system. More efficient schemes that allow the remote terminal to process the paging channels from asynchronous base stations while reducing the amount of time in the active state are highly desirable.

The invention provides various schemes to efficiently process paging channels in an asynchronous wireless communication system. In accordance with one aspect of the invention, if the base stations are not synchronized with each other and the remote terminal's designated page time is different from base station to base station, the remote terminal can wake up based on the earliest base station in the reacquisition search list. This allows the remote terminal to perform reacquisition searches and reacquisition handoff and avoid missing pages.

In accordance with another aspect of the invention, the criteria to select base stations for evaluation as reacquisition targets may be based on the received power of the base stations as well as their timing, both of which may be made relative to that of the preferred base station. In an embodiment, if, from the remote terminal's point of view, a neighboring base station's timing is in close proximity of the preferred base station's timing, and if the neighboring base station's signal is measured strong enough before entering the inactive state, then this neighboring base station can be considered for reacquisition handoff evaluation at the next wake-up interval, which is around the preferred base station's designated paging indicator time, based on a first (more relaxed) set of criteria. Otherwise, if the timing of the neighboring base station is outside the time proximity of the preferred base station and requires the remote terminal to wake up at another (separate) time, then this neighboring base station can be evaluated at its designated paging indicator time based on a second (more stringent) set of criteria. This can reduce the amount of time the remote terminal needs to be in the active state, which can translate to improvement in the remote terminal's stand-by time, while avoiding missing important paging information.

In accordance with yet another aspect of the invention, the remote terminal may wake up multiple times in a particular DRX cycle if the preferred base station and strong neighboring base stations (handoff candidates) are outside the timing proximity of each other. A neighboring base station may be identified as a handoff candidate if it meets a set of criteria, which may be based on the base station energy measurement and a reselection timer value, as described in further detail below.

For a W-CDMA system, a reselection timer is used to prevent continual handoff of a remote terminal between multiple base stations due to fluctuations in the received power from the base stations. If the received power from a neighboring base station is determined to be greater than a requisite power level (e.g., greater than the received power of the preferred base station, and possibly by a particular margin), a reselection timer for this neighboring base station is reset and the remote terminal continues to measure the power from the neighboring base station. The remote terminal is handed off to this neighboring base station only if the base station's received power continues to be stronger than the requisite power level for a particular time period specified by the system, which is referred to as the reselection time in the W-CDMA standard.

The remote terminal typically maintains a reselection timer for each neighboring base station that is a potential handoff candidate. The value in the reselection timer indicates the amount of time the base station was received stronger than the requisite power level. In an embodiment, the reselection timer is updated by the remote terminal just prior to entering the inactive state, and the value stored in the timer is reflective of the time value at the next wake-up interval, which assumes that the base station will be received above the requisite power level during the next inactive period.

If a new neighboring base station is found to be stronger than the requisite power level during a priority search in the current wake-up interval, the reselection timer for that neighboring base station may be initialized to a particular value. Since the remote terminal does not measure any base station signal during the inactive state, the exact time when the neighboring base station's signal is sufficiently stronger than that of the preferred base station is not known. Therefore, the reselection timer may be initialized to one-half the time period since the last wake-up interval (i.e., $T_{IP\_LAST}/2$), which represents a statistical means of when such event could have occurred. Alternatively, the reselection timer may be initialized to zero or some other value.

As noted above, the value of the reselection timer calculated in the current active state for a neighboring base station represents the time value at the next wake-up interval. In an embodiment, if the timing of the neighboring base station is within the time proximity of the preferred base station (e.g., base station 2 in FIG. 3), then the initial value for the reselection timer for this base station can be further updated by the time period to the next wake-up interval (i.e., $T_{IP\_NEXT}$). In another embodiment, if the timing of the neighboring base station is outside the time proximity of the preferred base station (e.g., base station 3 in FIG. 3), then the initial value for the reselection timer for this base station can be increased by the time difference between that base station and the preferred base station. For example, if base station 3 is received above the requisite power level for the first time in the current wake-up interval, then the timer for base station 3 may be initialized to $T_{IP\_LAST}/2+T_{13}$ (and not $T_{IP\_LAST}/2+T_{IP\_NEXT}$) since the remote terminal would need to wake up at $T_3$ to process the page indicator for base station 3 (and not $T_1$). This additional amount (i.e., $T_{13}$) represents the time as if the remote terminal is to wake up for the page indicator for this neighboring base station at its designated time (e.g., $T_3$).

For a new neighboring base station that has not reach the requisite power level in the current wake-up interval, but is predicted to reach this level by the next wake-up interval and is in close timing-proximity of the preferred base station, the reselection timer for the base station may be initialized to one-half the time period to the next wake-up interval (i.e., $T_{IP\_NEXT}/2$).

For each neighboring base station that has been added to the priority list in an earlier wake-up interval and is received stronger than the requisite power level in the current wake-up interval, the reselection timer for the base station is updated by the time period to the next wake-up interval (i.e., $T_{IP\_NEXT}$).

In an embodiment, prior to entering the inactive state, the remote terminal builds the reacquisition search list, which includes the preferred base station (the current serving cell) and neighboring base stations that may be handoff candidates at the next wake-up interval. The reacquisition search list includes the neighboring base stations from the priority list which have updated reselection timer values exceeding the reselection time specified by the system. In an embodiment, the criteria for selecting the neighboring base stations for inclusion in the reacquisition search list are further based on the timing of the neighboring base station and its received power.

Referring back to the example shown in FIG. 3, the time period $T_{21}$ is sufficiently small and within a particular time window ($T_{WINDOW}$) so that the remote terminal considers base station 2 to be in the time proximity of the preferred base station 1. In a specific embodiment, the time window can be defined as twice the transition period, the period needed to power on circuits and initialize functions allowing the remote terminal to perform searches, although some other window period can also be used. Since base station 2 is within the time proximity of the preferred base station 1, base station 2 can be added to the reacquisition search list for the next wake-up interval based on the relaxed set of criteria. For example, base station 2 may be added to the reacquisition search list if its updated reselection timer value for the next wake-up is greater than or equal to the specified reselection time and as long as its received power at the remote terminal is greater than a particular threshold level, which may be set lower than the requisite power level.

In the example shown in FIG. 3, the time period $T_{13}$ between the preferred base station 1 and base station 3 exceeds the time window, and base station 3 is not considered to be within the time proximity of the preferred base station 1. Thus, a more stringent set of criteria may be applied to base station 3 before it can be added to the reacquisition search list. For example, besides requiring the reselection timer value to be greater than or equal to the specified reselection time, the received power from base station 3 may be required to exceed the required power level (e.g., be stronger than the received power for the preferred base station 1, and possibly by a certain margin).

Based on the above, since base station 2 is within the time proximity of the preferred base station 1, base station 2 may be placed on the reacquisition search list, along with the preferred base station 1, if base station 2 can meet the more relaxed set of criteria. And since base station 3 is not within the time proximity of the preferred base station 1, base station 3 may be added to the reacquisition search list if base station 3 can meet the more stringent set of criteria. If base station 3 is identified to be a handoff candidate, the remote terminal can wake up more than once in one DRX cycle. At this time, base stations 1 and 3 can be evaluated. If base station 1 is again determined to be better received than base station 3, the remote terminal continues to select base station 1 as the preferred base station. Otherwise, the remote terminal selects base station 3 as the new preferred base station and demodulates the page indicator for base station 3.

Figure 4:
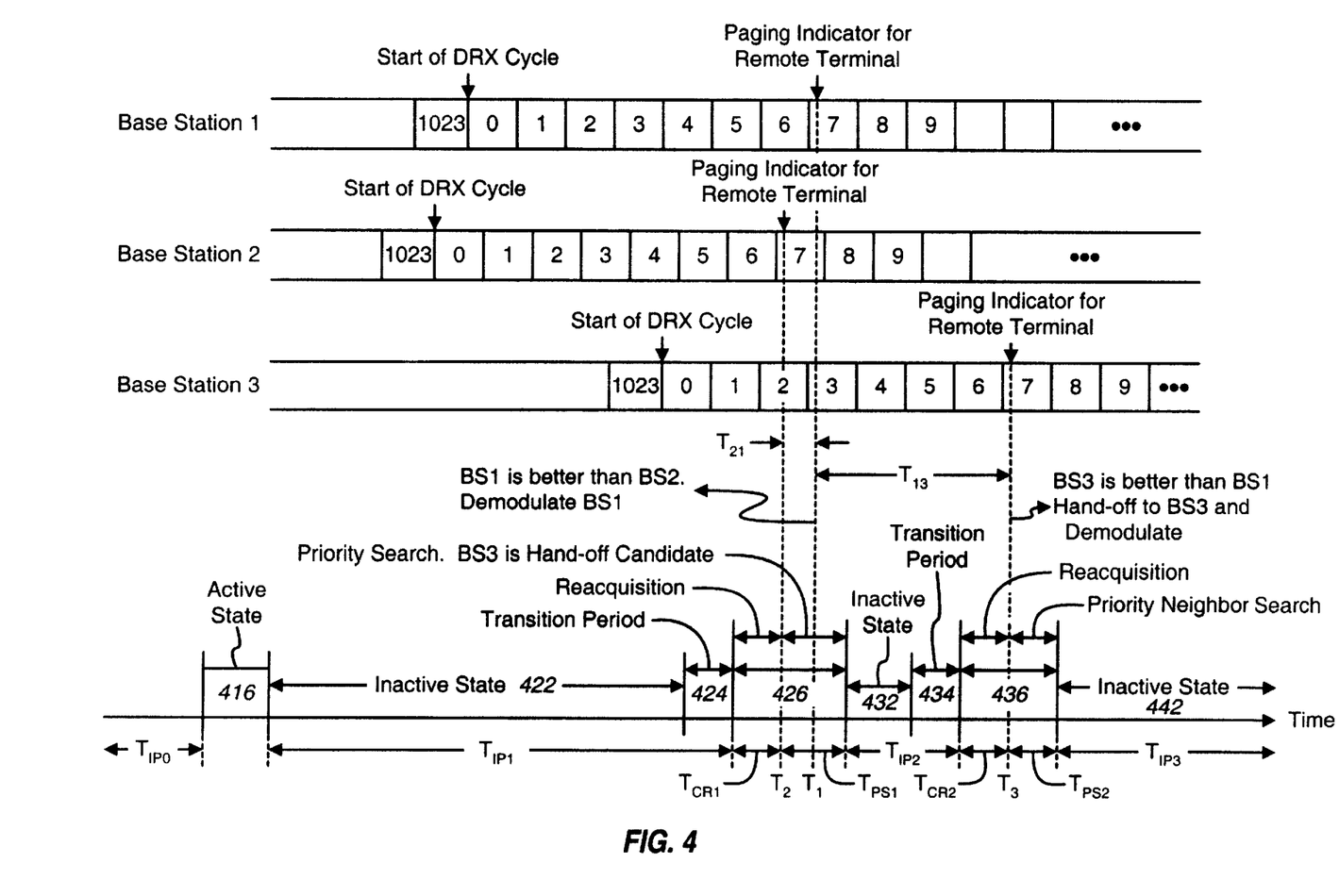
FIG. 4 is a diagram of the processing of the paging channels from a number of asynchronous base stations in an asynchronous system, in accordance with an embodiment of the invention.

FIG. 4 is a diagram of the processing of the paging channels from a number of base stations in an asynchronous system, in accordance with an embodiment of the invention. Initially, during the previous active period (block 416) and before entering the sleep cycle (block 422), base station 2 was identified by the remote terminal to be good enough to be evaluated as a possible handoff candidate (e.g., based on a predicted received power for base station 2 from previous power measurements) even though its received power is less than the requisite power level. The remote terminal then calculates the reselection timer for base station 2 as half of the next inactive period (i.e., $T_{IP1}/2$). For the example shown in FIG. 4, the reselection time is specified to be less than $T_{IP1}/2$, and base station 2 is added to the reacquisition search list since its timer value is greater than the specified reselection time.

Prior to the next wake-up interval for the frame assigned by the preferred base station 1, the remote terminal wakes up, passes through the transition period (block 424), and enters the active state (block 426). The remote terminal then performs reacquisition of the base stations in the reacquisition search list, which includes base stations 1 and 2, during time period $T_{CR1}$. In this example, base station 1 is determined to be better received than base station 2. Thus, the remote terminal retains base station 1 as the preferred base station and demodulates the page indicator for base station 1 starting at the designated time $T_1$, as shown in FIG. 4. If base station 2 had been determined to be better received than base station 1, the remote terminal would be handed off to base station 2 and would then demodulate the page indicator for base station 2 at the designated time $T_2$. If the received power of base station 2 is lower than a particular deselection threshold level (e.g., which may be the lower threshold level described above), the reselection timer for base station 2 may be reset and base station 2 may be removed from the reacquisition search list.

After the base stations in the reacquisition search list have been reacquired, the remote terminal performs a priority search for new neighboring base stations, during time period $T_{IP1}$. In this example, base station 3 is identified to be a handoff candidate for the remote terminal but its timing is determined to be outside of the time proximity of the preferred base station 1. The reselection timer for base station 3 is thus calculated as half of the last inactive period plus $T_{13}$ (i.e., $T_{IP1}/2+T_{13}$). Again, since $T_{IP1}/2+T_{13}$ is greater than the specified reselection time, base station 3 is added to the reacquisition search list. And because the page indicator for base station 3 is earlier than the next page indicator for the preferred base station 1, the remote terminal schedules to wake up a second time in this DRX cycle to process the page indicator for base station 3.

After demodulating the page indicator for base station 1, the remote terminal enters the sleep cycle (block 432). Prior to the next wake-up interval for the frame assigned by base station 3, the remote terminal wakes up, passes through the transition period (block 434), and enters the active state (block 436). The remote terminal then performs reacquisition of the base stations in the reacquisition search list, which includes base stations 1 and 3, during time period $T_{CR2}$. In this example, base station 3 is determined to be better received than the preferred base station 1. Thus, the remote terminal is handed off to base station 3 and thereafter demodulates the page indicator for base station 3 starting at the designated time $T_3$, as shown in FIG. 4. The remote terminal also performs a priority search for new neighboring base stations, during time period $T_{PS2}$. Thereafter, the remote terminal updates the reselection timers for the neighboring base stations, builds the reacquisition search list for the next wake-up interval, and enters the sleep cycle (block 442).

Figure 5:
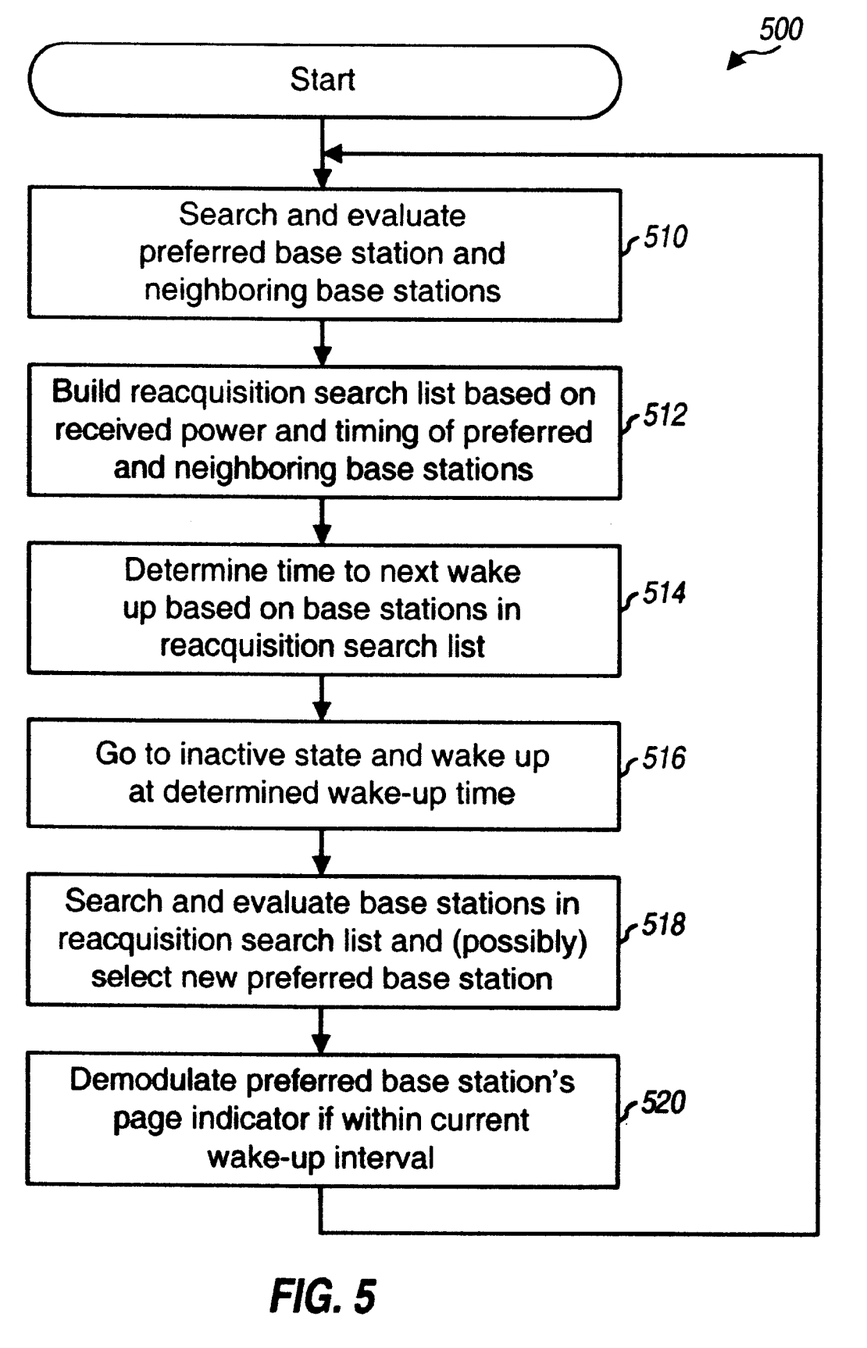
FIG. 5 is a flow diagram of an overall process for processing the paging channels in an asynchronous wireless communication system, in accordance with an embodiment of the invention.

FIG. 5 is a flow diagram of an overall process 500 for processing the paging channels in an asynchronous wireless communication system, in accordance with an embodiment of the invention. Initially, during the current active state, the remote terminal reacquires the base stations in the reacquisition search list, searches for new neighboring base stations, and evaluates these base stations, at step 510. The evaluation may include determining the received power for the base stations and their timing (e.g., the start of the DRX cycles for the base stations). The remote terminal typically also demodulates the page indicator for the preferred base station during this wake-up interval.

Prior to entering the sleep cycle, the remote terminal builds the reacquisition search list for the next wake-up interval based on a set of criteria, at step 512. In accordance with an aspect of the invention, this set of criteria is based on the received power for the base stations and their timing, as described herein. In another aspect, the set of criteria is further based on the reselection timers associated with the base stations.

In conjunction with building the reacquisition search list, the remote terminal also determines the time to next wake up based on the base stations in the reacquisition search list, at step 514. The next wake-up interval may be for the current preferred base station or a candidate base station to which the remote terminal may be handed off. The next sleep cycle (i.e., the inactive period) for the remote terminal is selected such that the remote terminal will transition to the active state early enough to demodulate the page indicator of the earliest base station in the reacquisition search list. Steps 512 and 514 are typically performed together, and are described in further detail below.

After the required processing for the current wake-up interval is completed, the remote terminal enters the inactive (i.e., sleep) state, at step 516. At the previously determined wake up time, the remote terminal wakes up, passes through the transition period, and enters the active state, also at step 516.

In the active state, the remote terminal searches and evaluates the base stations in the reacquisition search list, at step 518. Based on the results of the evaluation, the remote terminal determines whether a new base station may be selected as the new preferred base station, also in step 518. The remote terminal also searches for new base stations that may be handoff candidates, in step 518. If the assigned paging indicator of the current preferred base station (which may be the newly selected preferred base station) is within the current wake-up interval, the remote terminal demodulates the paging indicator for the preferred base station, at step 520.

Figure 6:
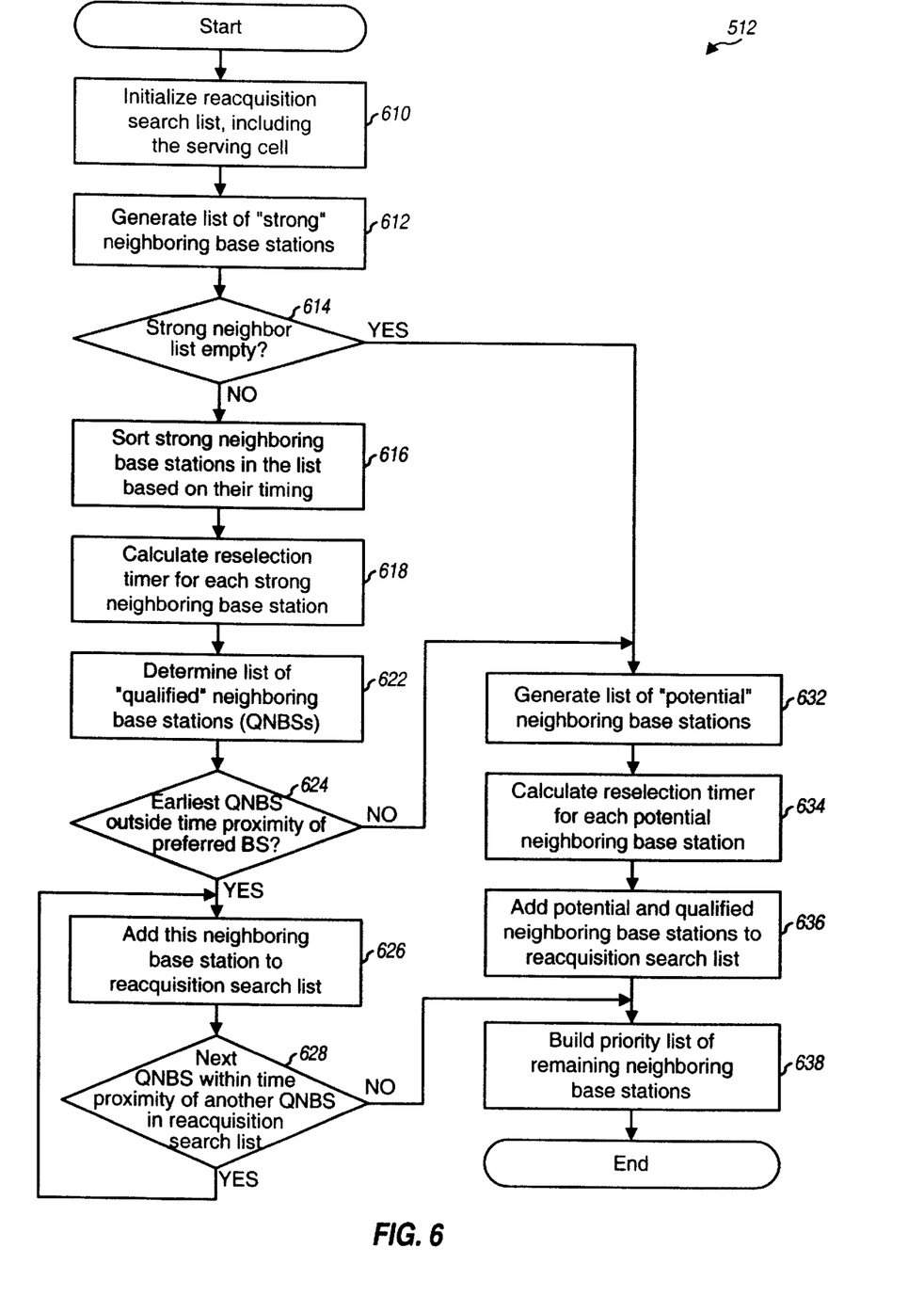
FIG. 6 is a flow diagram of an embodiment of a process to build a reacquisition search list.

FIG. 6 is a flow diagram of an embodiment of a process to build the reacquisition search list, which implements step 512 in FIG. 5. Initially, the remote terminal builds the reacquisition search list for the next wake-up interval and includes in this list the current preferred base station, at step 610. Next, after the serving and neighboring base stations have been searched and evaluated, a list of "strong" neighboring base stations is generated, at step 612. Various tests can be used to determine whether a neighboring base station is considered strong. For example, a neighboring base station may be considered strong if its received power is greater than the requisite power level (e.g., stronger than the received power of the preferred base station, and possibly by a margin). Some other tests for classifying strong neighboring base station may also be used and are within the scope of the invention.

A determination is then made whether there are any strong neighboring base stations in the list, at step 614. If the strong neighbor list is empty, the process proceeds to step 632. Otherwise, the strong neighboring base stations in the list are sorted based on their timing, at step 616. This sorting can be achieved by determining the page indicator for each base station and arranging the base stations in a chronological order based on the timing of their paging indicators. For the example shown in FIG. 4, the list may include base station 2 and base station 3, in that order.

The reselection timer for each strong neighboring base station is then calculated or updated, at step 618. As noted above, for some wireless communication system (e.g., the W-CDMA system), the remote terminal is not handed off from the current preferred base station to another neighboring base station unless the received power from that neighboring base station exceeds the received power from the preferred base station for a particular time period referred to as the reselection time. To support this design, each strong neighboring base station in the list can be associated with a reselection timer that maintains track of the amount of time the received power from that base station has exceeded the received power from the preferred base station. For the above-described implementation, the value in the reselection timer indicates received power from the neighboring base station will have exceeded the received power from the preferred base station at the next wake-up interval.

If a strong neighboring base station has just been added to the list in the current wake-up interval, the reselection timer for that base station may be initialized to a particular initial value. In an embodiment, the initial value is based on the page indicator timing and the last inactive period, as described above.

If a strong neighboring base station is received above the requisite power level for the first time during the priority neighbor searches in the current wake-up interval, the initial timer value can be updated as half of the last inactive period plus the next inactive period (e.g., $T_{IP1}/2+T_{13}$ for base station 3 in FIG. 4, if it was found during active state 426, or e.g., $T_{IP1}/2+T_{IP1}$ for base station 2 in FIG. 4, if it was found during active state 426). If a neighboring base station within close timing proximity of the preferred base station is received below the requisite power level but is strong enough to be a handoff candidate during the next wake-up interval, the initial reselection timer value for the neighbor can be updated as half of the next inactive period (e.g., $T_{IP1}/2$ for base station 2 in FIG. 4, if it was found during active state 426). The remote terminal then determines a list of "qualified" neighboring base stations for possible inclusion in the reacquisition search list, at step 622. A qualified neighboring base station is a candidate base station to which the remote terminal may be handed off at the next wake-up interval. In an embodiment, a strong neighboring base station may be considered qualified if its calculated reselection timer value is greater than the reselection time specified by the system.

The neighboring base stations to be processed at the next wake-up interval are then determined. As indicated in FIG. 4, the remote terminal typically wakes up once during each DRX cycle to process the page indicator for the preferred base station, but may wake up multiple times during a particular DRX cycle if there are handoff candidates having page indicators located outside the time proximity of the preferred base station.

At step 624, a determination is made whether the page indicator of the earliest qualified neighboring base station is outside the time proximity of the preferred base station. If the answer is no, the next wake-up interval is based on the timing of the preferred base station plus the small timing difference of neighboring base stations in the reacquisition list, and the process proceeds to step 632. Otherwise, if the earliest qualified neighboring base station is outside the time proximity of the preferred base station, the next wake-up interval is based on the timing of the earliest qualified neighboring base station. This can be achieved by adding the earliest qualified neighboring base station to the reacquisition search list, at step 626. A determination is then made whether the next qualified neighboring base station is within the time proximity of a qualified neighboring base station already in the reacquisition search list (and also if another neighboring base station can be added to this list), at step 628. If the answer is yes, that next qualified neighboring base station is also added to the reacquisition search list, back at step 626. Otherwise, if no other qualified neighboring base stations are within the time proximity or the reacquisition search list is full, the process proceeds to step 638.

The path starting with step 632 is traversed if the next wake-up interval is based on the timing of the preferred base station. If this case, neighboring base stations that meet the relaxed set of criteria may also be included in the reacquisition search list, as described above. Thus, the remote terminal generates a list of "potential" base stations, at step 632. A potential base station may be a neighboring base station that is received with sufficient power, which is above the first threshold level but lower than the requisite power level. The remote terminal then calculates the reselection timer for each potential base station in the list, at step 634.

The remote terminal includes the potential and qualified neighboring base stations that are within the time proximity of the preferred base station and have calculated reselection timer values greater than the reselection time specified by the system, at step 636. This reacquisition search list thus includes neighboring base stations that are within the time proximity of the preferred base station and meeting the more relaxed set of criteria (e.g., with received power less than required to be considered a strong neighboring base station). This reacquisition search list further includes the qualified neighboring base stations that are within the time proximity of the preferred base station. The remote terminal also builds a priority list containing the remaining neighboring base stations, at step 638. This priority list includes base stations to be evaluated at the next wake-up interval but are not handoff candidates (e.g., because their reselection timer values are less than the specified reselection time). The reacquisition search list building process then terminates.

After the remote terminal finishes processing the base stations in the current wake-up interval, it enters the inactive state at step 516 to conserve power. At the previously determined time to wake up, the remote terminal wakes up, passes through the transition period, and thereafter enters the active state for the next wake-up interval, also at step 516. The remote terminal is then ready to process the base stations for this wake-up interval.

Figure 7:
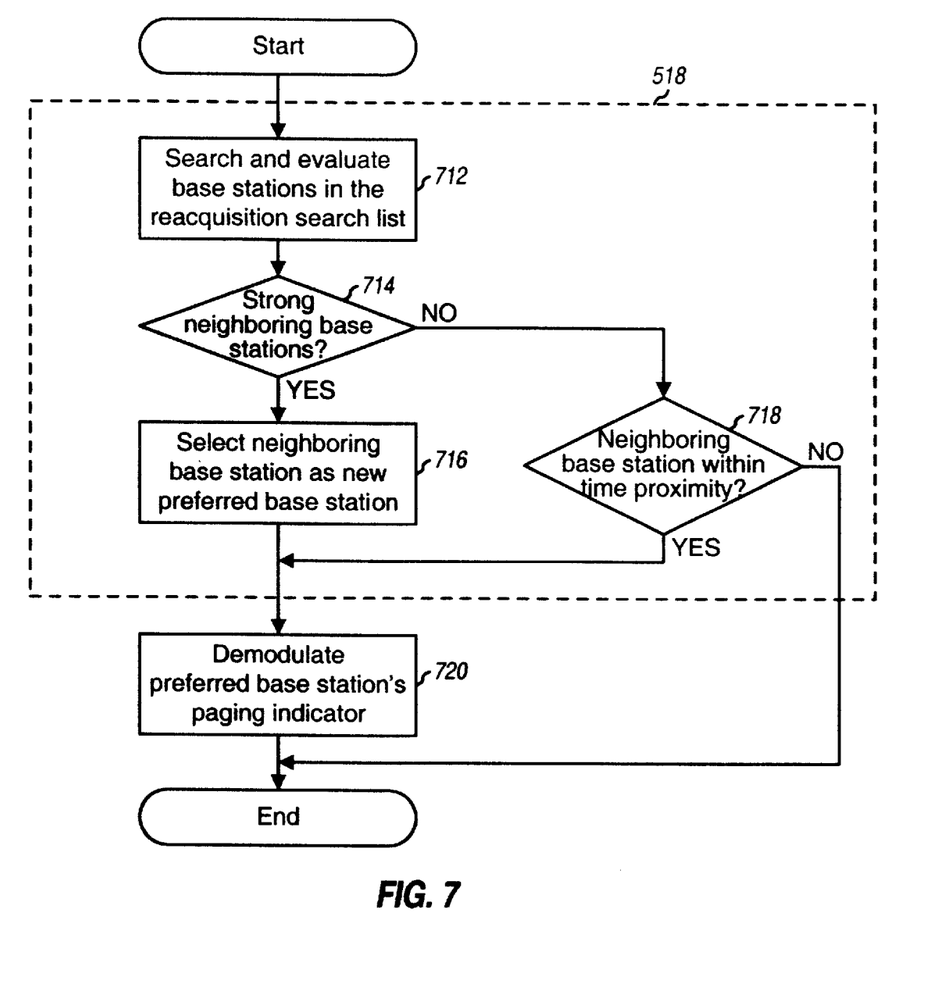
FIG. 7 is a flow diagram of an embodiment of the handoff evaluation based on search results of base stations in the reacquisition search list at a subsequent wake-up interval.

FIG. 7 is a flow diagram of an embodiment of the handoff evaluation based on search results of base stations in the reacquisition search list at the next wake-up interval. Initially, the remote terminal searches and evaluates the base stations in the reacquisition search list, at step 712. A determination is then made as to which ones of the neighboring base stations in the reacquisition search list, if any, have received power that exceeds the requisite power level, at step 714. If one or more such neighboring base stations are present, the remote terminal selects, for example, the strongest neighboring base stations as the new preferred base station, at step 716. Otherwise, if no base station is sufficiently strong, a determination is made whether the page indicator of the preferred base station is within the current wake-up interval, at step 718. If the answer is no, indicating that the current wake-up interval is for a handoff candidate base station that is outside the time proximity of the preferred base station, the process terminates. Otherwise, the page indicator of the current preferred base station is demodulated, at step 520. This preferred base station may be the new preferred base station just selected in step 716 or the prior preferred base station.

Figure 8:
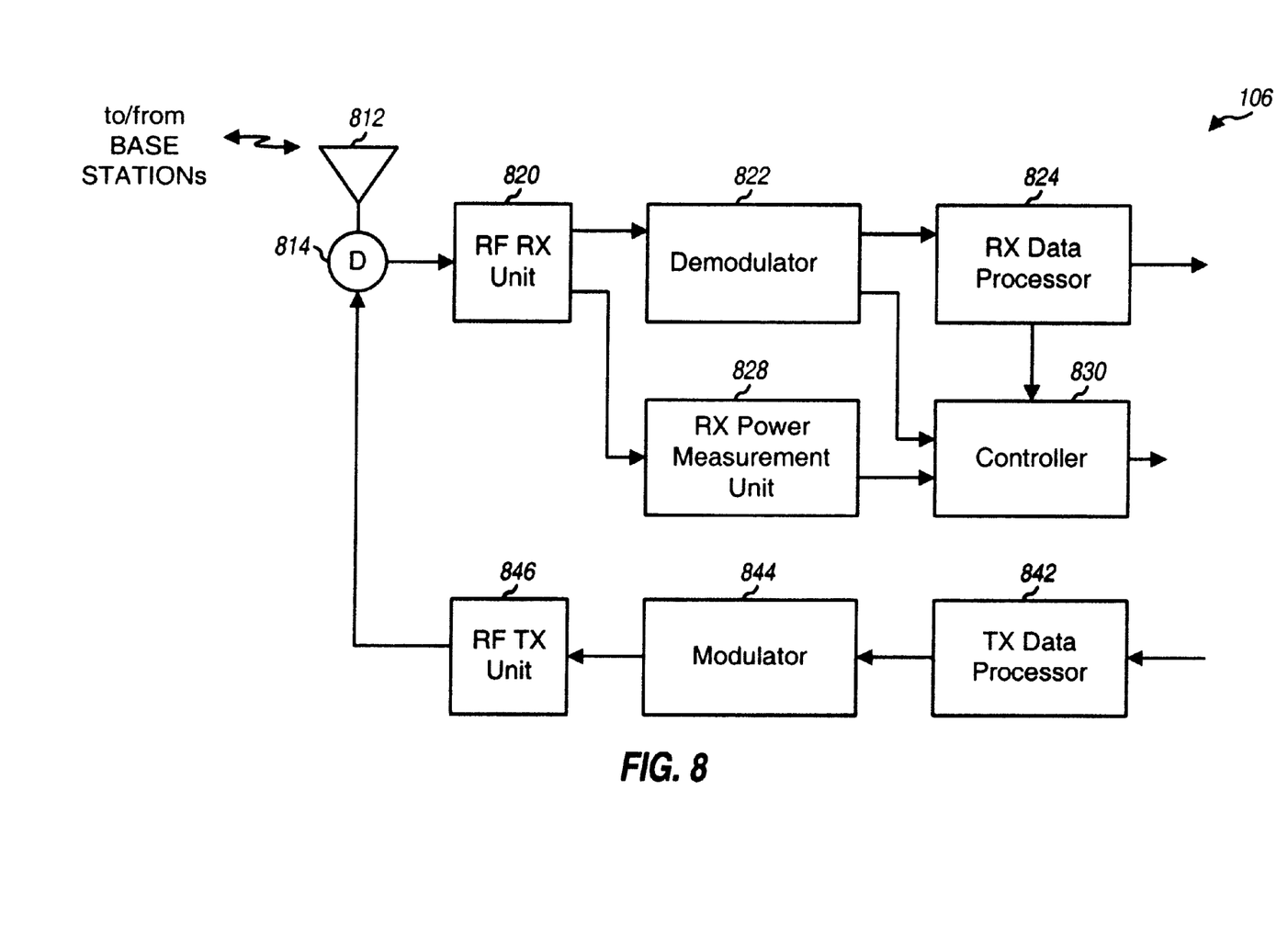
FIG. 8 is a block diagram of an embodiment of a remote terminal capable of implementing various aspects of the invention.

FIG. 8 is a block diagram of an embodiment of remote terminal 106 capable of implementing various aspects of the invention. The forward link signal is received by an antenna 812, routed through a duplexer 814, and provided to an RF receiver (RX) unit 820. RF receiver unit 820 conditions (e.g., filters, amplifies, and downconverts) and digitizes the received signal to provide samples. A demodulator 822 receives and processes (e.g., despreads, decovers, and pilot demodulates) the samples to provide recovered symbols. Demodulator 822 may implement a rake receiver that processes multiple instances of the received signal from one or more base stations and generates combined recovered symbols. Demodulator 822 may be designed to process the paging channel to receive page indicator. For encoded data, a receive data processor 824 decodes the recovered symbols, checks the received frames, and provides the output data. Demodulator 822 and receive data processor 824 may be operated to process multiple transmissions (e.g., paging channels) received from multiple base stations.

As noted above, several parameters are used to determine the base stations to be included in the reacquisition search list. In an embodiment, these parameters include the timing of the preferred base station, the received power of the preferred and neighboring base stations, and the timing of the neighboring base stations relative to that of the preferred base station. The timing of the preferred and neighboring base stations may be obtained by processing the digitized samples within demodulator 822 and determining the start of their DCX cycles. And for received power determination, the samples from RF receiver unit 820 may be provided to an RX power measurement unit 828 that measures the power of the preferred and neighboring base stations using various techniques known in the art.

A controller 830 receives the timing indications from demodulator 822 and the power measurements from RX power measurement unit 828 and determine the reacquisition search list and the next wake-up interval in the manner described above. Although not shown in FIG. 8 for simplicity, controller 830 also provides control signals that direct some of the units in remote terminal 106 to power down during a sleep cycle and to power up at the wake-up interval.

On the reverse link, data is processed (e.g., formatted, encoded) by a transmit (TX) data processor 842, further processed (e.g., covered, spread) by a modulator 844, and conditioned (e.g., converted to analog signals, amplified, filtered, quadrature modulated, and so on) by an RF transmitter unit 846 to generate a reverse link signal. The reverse link signal is routed through duplexer 814 and transmitted via antenna 812 to one or more base stations 104.

The processing to evaluate the neighboring base stations and build the reacquisition search list and to achieve other aspects of the invention can be implemented by various means. For example, the processing can be implemented with hardware, software, or a combination thereof. For a hardware implementation, the elements can be implemented within one or more application specific integrated circuits (ASICs), digital signal processors (DSPs), programmable logic devices (PLDs), controllers, micro-controllers, microprocessors, other electronic units designed to perform the functions described herein, or a combination thereof. For a software implementation, the elements can be implemented with modules (e.g., procedures, functions, and so on) that perform the functions described herein. The software code can be stored in a memory unit and executed by a processor (e.g., controller 830).

Although various aspects, embodiments, and features of the reacquisition, handoff, and paging channel processing have been specifically described for the W-CDMA system, many of these techniques can be advantageously applied for other communication systems, especially asynchronous systems. Also, the techniques described herein can be used for other paging channel structures such as, for example, the slotted paging channel structure used for the IS-95 CDMA system.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. At a terminal in a wireless communication system, a method for processing a plurality of transmissions from a plurality of transmitters, wherein one transmitter is designated as a preferred transmitter from which messages intended for the terminal may be transmitted, the method comprising:
   receiving the plurality of transmissions from the plurality of transmitters;
   determining a received power for each of the plurality of transmitters;
   determining a timing associated with each of the plurality of transmitters; and
   forming a first list of one or more transmitters to evaluate at a subsequent time period based on the determined received power and timing for the plurality of transmitters.

2. The method of claim 1, wherein the plurality of transmissions are asynchronous with respect to the timing of the preferred transmitter.

3. The method of claim 1, wherein the timing for each transmitter is defined based on a start of a system frame for the transmitter.

4. The method of claim 1, wherein the one or more transmitters in the first list include transmitters to which the remote terminal may be handed off at the subsequent time period.

5. The method of claim 1, wherein a transmitter having timing within a particular time window of the preferred transmitter is included in the first list if the transmitter meets a first set of criteria, and wherein a transmitter having timing outside the particular time window of the preferred transmitter is included in the first list if the transmitter meets a second set of criteria.

6. The method of claim 5, wherein a first criteria in the first set is met if the received power exceeds a first threshold power level, and wherein a first criteria in the second set is met if the received power exceeds a second threshold power level that is greater than or equal to the first threshold power level.

7. The method of claim 1, wherein remaining ones of the plurality of transmitters other than the preferred transmitter are designated as neighbor transmitters, the method further comprising:
   maintaining a timer for each neighbor transmitter having received power that exceeds a requisite power level, wherein the timer is indicative of an estimated amount of time in which the associated neighbor transmitter is received above the requisite power level.

8. The method of claim 7, wherein the first list of one or more transmitters is further formed based in part on values in timers maintained for neighbor transmitters.

9. The method of claim 8, wherein a neighbor transmitter is considered for inclusion in the first list if its timer exceeds a specified reselection time.

10. The method of claim 7, wherein the maintaining includes
    initializing the timer for a particular neighbor transmitter with an initial value if the neighbor transmitter is received above the requisite power level for a first time in a current active time period.

11. The method of claim 7, wherein the maintaining includes
    initializing the timer for a particular neighbor transmitter with an initial value if the neighbor transmitter is received, for a first time in a current active time period, above a first power level that is lower than the requisite power level, wherein the initial value is selected as half of a time duration for a next active time period.

12. The method of claim 10, wherein the initial value for a neighbor transmitter having a timing within the particular time window of the preferred transmitter is selected as 1.5 times a time duration since a last active time period.

13. The method of claim 10, wherein the initial value for a neighbor transmitter having a timing outside the particular time window of the preferred transmitter is selected as half of a time duration since a last active time period plus a time difference between the timing of the preferred transmitter and the neighbor transmitter.

14. The method of claim 10, wherein the maintaining includes
    updating the timer for each neighbor transmitter with an update value if the neighbor transmitter is received above the requisite power level for a subsequent time in the current active time period.

15. The method of claim 14, wherein the update value is selected as a time duration for a next inactive time period.

16. The method of claim 1, wherein for each of the one or more transmitters in the first list, the terminal is associated with a page indicator corresponding to a time in which a message may be transmitted by the transmitter to the terminal.

17. The method of claim 16, wherein the subsequent time period is selected based on an earliest page indicator for the one or more transmitters in the first list.

18. The method of claim 16, wherein the subsequent time period is selected based on the page indicator for the preferred transmitter if no other transmitter in the list has an earlier page indicator.

19. The method of claim 1, further comprising:
    forming a second list of transmitters to evaluate at the subsequent time period based on the determined received power and timing for the plurality of the transmitters, wherein each transmitter in the second is not a candidate to which the remote terminal may be handed off at the subsequent time period.

20. The method of claim 1, further comprising:
    entering into an inactive state until the subsequent time period.

21. The method of claim 1, further comprising:
    receiving one or more transmissions from the one or more transmitters in the first list at the subsequent time period; and
    determining a received power for each of the one or more transmitters in the first list.

22. The method of claim 21, further comprising:

handing off to a particular neighbor transmitter in the first list if the received power for the neighbor transmitter at the subsequent time period exceeds a requisite power level.

23. At a terminal in a wireless communication system, a method for processing a plurality of transmissions from a plurality of base stations, wherein one base station is designated as a preferred base station from which messages intended for the terminal may be transmitted and remaining base stations are designated as neighbor base stations, the method comprising:

receiving the plurality of transmissions from the plurality of base stations;

determining a received power for each base station;

determining a timing associated with each base station based on a start of a system frame for the base station, wherein the timing for the plurality of base stations are asynchronous with respect to the timing of the preferred base station;

maintaining a timer for each neighbor base station having received power that exceeds a requisite power level, wherein the timer is indicative of an estimated amount of time the associated neighbor base station is received above the threshold power level; and forming a list of one or more base stations to evaluate at a subsequent time period based on the received power, the timing, and the timer for the base stations.

24. A receiver processing unit for use in a wireless communication system, comprising:

a receiver operative to receive and process a plurality of transmissions from a plurality of transmitters to generate a plurality of streams of samples;

a power measurement unit coupled to the receiver and operative to receive the plurality of streams of samples and determine a received power for each of the plurality of transmitters;

a demodulator coupled to the receiver and operative to receive the plurality of streams of samples and determine a timing associated with each of the plurality of transmitters; and a controller coupled to the power measurement unit and the demodulator, the controller operative to form a list of one or more transmitters to evaluate at a subsequent time period based on the received power and timing for the transmitters.

25. The receiver processing unit of claim 1, wherein the controller is further operative to maintain a timer for each neighbor transmitter having received power that exceeds a requisite power level, wherein the timer is indicative of an estimated amount of time the associated neighbor transmitter is received above the requisite power level.

* * * * *